Patented Nov. 11, 1941

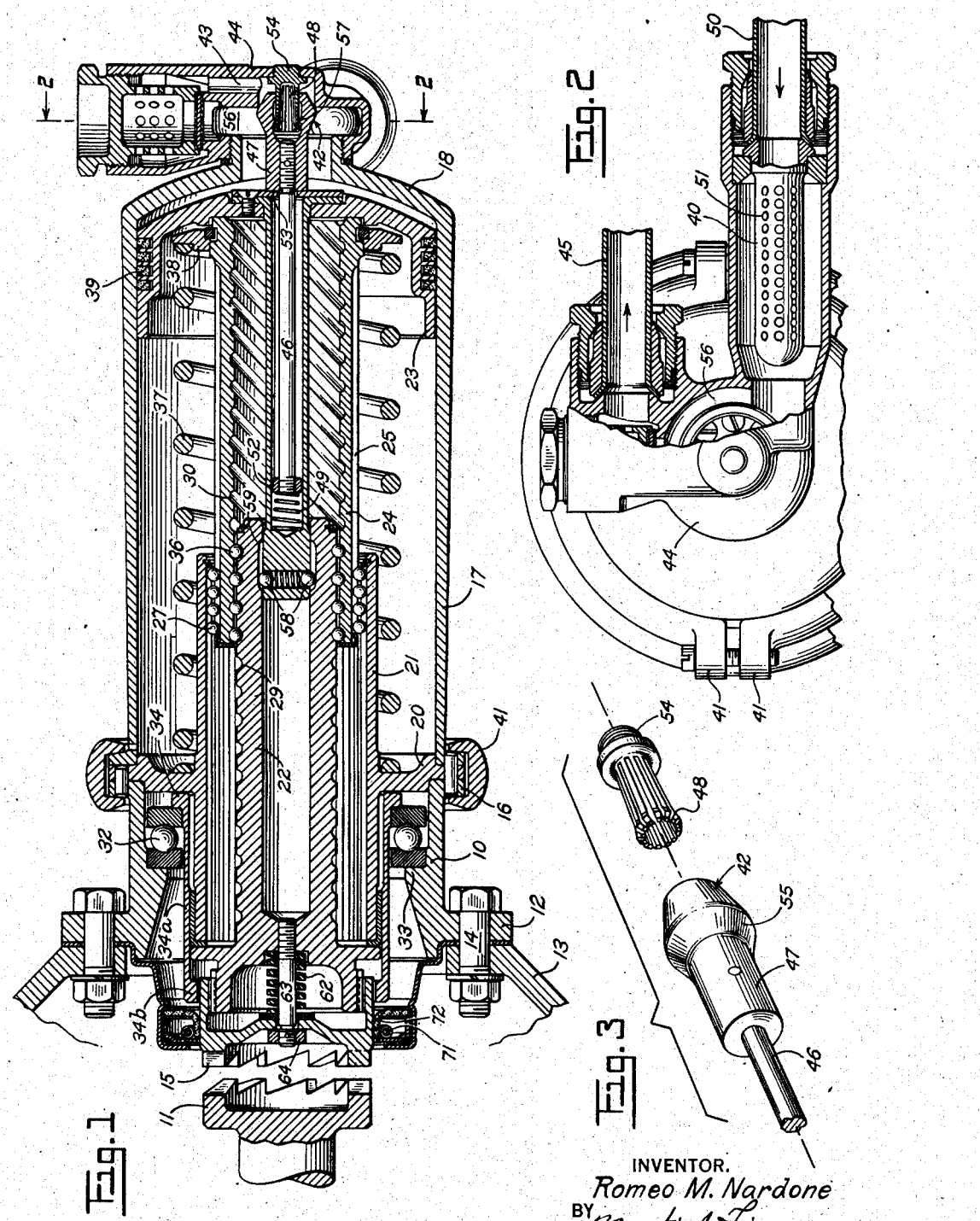
Nov. 11, 1941.     R. M. NARDONE     2,262,333
ENGINE STARTING MECHANISM
Original Filed Oct. 2, 1937
INVENTOR.
Romeo M. Nardone
BY Martin J. Finnegan
ATTORNEY.

2,262,333

UNITED STATES PATENT OFFICE 2,262,333

ENGINE STARTING MECHANISM

Romeo M. Nardone, Westwood, N. J., assignor, by mesne assignments, to Bendix Aviation Corporation, South Bend, Ind., a corporation of Delaware Original application October 2, 1937, Serial No. 167,054. Divided and this application November 13, 1940, Serial No. 365,521

2 Claims. (Cl. 192—42)

This invention relates to engine starting mechanism, and particularly to the type having a rotatable element movable from a normally inoperative position to an engine engaging position, for producing initial rotary movement of the engine to be started.

An object of the invention is to improve the engine engaging action by the provision of novel control means acting upon the engine engaging element.

These and other objects of the invention will become apparent from inspection of the following specification when read with reference to the accompanying drawing wherein is illustrated the preferred embodiment of the invention. It is to be expressly understood, however, that the drawing is for the purpose of illustration only, and is not designed as a definition of the limits of the invention, reference being had to the appended claims for this purpose.

In the drawing:

Fig. 1 is a longitudinal sectional view of a device embodying the invention;

Fig. 2 is a transverse sectional view along the line 2—2 of Fig. 1; and

Fig. 3 is a perspective view of the valve assembly.

In the drawing the invention is shown embodied in an engine starting mechanism of the type utilizing a reciprocable piston contained within a sectional housing including cylindrical parts 17 and 10, the latter having a flange 12 by which it is secured to the engine crankcase 13 as by bolts 14, the flange being conveniently of a size standardized for aircraft engine starters. The engine crankshaft, or other drive shaft (not shown) is provided with a clutch element 11 engageable by the piston actuated clutch element 15 as will be later more fully described.

Cylinder 17 has a head end 18 and a crank end 20, the latter being shown as an integral part of a splined tube 21. Member 20 is shown as abutting flange 16 of housing section 10, and surrounded by a split clamp 41 which retains parts 10, 17 and 20 in assembled relationship. Slidably fitted within the cylinder 17 is a piston 23 movable with a hollow internally and helically grooved screw 24 which is externally splined as at 25, to cooperate with the internally splined tube 21, a free sliding action being facilitated by provision of balls 27. A second screw 22 is drivably connected with the screw 24 by helical grooves or threads 29 and 30 which permit the axial travel of the piston 23 but cause rotation of the screw 22 because of friction reducing balls 36 inserted in the helical grooves 29 and 30. An anti-friction thrust bearing 32 is preferably interposed between a flanged skirt 34 on rear end of spacer 34a and an inwardly extending circular rim 33 of the cylindrical part 10. The inwardly extending rim 34b on the forward end of spacer 34a takes the thrust as jaw 15 rides into mesh with engine member 11. A spring 37 has one end resting against the closure plate 20 of the cylinder 17, and its opposite end abuts the thrust ring 38 which moves forward with the piston 23. Piston rings 39 insure against the loss of pressure as the piston moves forward, and also yieldably oppose rotation of the piston, even though twisting of spring 37 should occasionally cause ring 38 to rotate to some extent (the said ring 38 having a running fit about screw 24).

An exhaust valve 42 is adapted to cooperate with an exhaust port 43 conveniently formed in the housing 44, and communicating with an exhaust connection 45 (Fig. 2) leading to any desired point. In the case of an airplane, for example, this exhaust connection will lead to a point exteriorly of the fuselage. The valve 42 is carried by a stem 46 which is of such a length that with the piston in the position indicated in Figure 1, a spring 49 will bear against an enlarged head 52 on the stem 46 to hold valve 42 closed. Into housing 44 there extends a cup-shaped grid 40 which receives that part of the powder charge which is propelled from the breech into the feed tube 50, said solid charge being then consumed by the generated heat, and the resultant gases pass through ports 51 into the chamber 56. This fluid pressure will act upon the head portion of the valve 42 in such manner as to assist the spring 49 in maintaining the said exhaust valve 42 closed; but as the piston nearly reaches the end of its movement, a collar 53 extending inwardly of piston 23 and surrounding the stem 46 will be brought into engagement with the head 52, and will be effective to unseat the exhaust valve 42. The exhaust valve having been unseated in the manner described, the fingered catch 48 (Figs. 1 and 3) will cooperate with the internally formed circular bead 57 of valve 42 for yieldably holding said valve in open position, its maximum opening movement being likewise limited by the restraining action of the fingers of said element 48. The neck portion 54 of catch 48 is externally threaded, as shown, for adjustably positionable retention in the housing 44.

By reason of the action of spring pressed balls 58 upon recess 59 in sleeve 22, the initial axial movement of the piston 23 will be transmitted to said sleeve 22, and the resultant axial thrust will be yieldably imparted to jaw 15 through a compressible spring 62 mounted on a rod 63 having at its outer end a nut 64 permitting adjustment of the action of spring 62. Upon resistance to axial travel (as by collision of the tooth corners) spring 62 will permit the continued advance of sleeve 22 under the urge of the balls 58 thereupon. Meanwhile the action of the threads 29, 30 will produce sufficient rotation of sleeve 22 and hence of clutch member 15, splined thereto, to relieve the condition of corner tooth contact, whereupon spring 62 becomes effective to complete the "meshing" (engaging) action. During this operation toroidal spring 71 exerts a radially directed pressure, through leather sealing gasket 72, upon the clutch member 15, producing a friction which prevents too rapid rotation of the member 15, prior to complete meshing, and hence tends to accelerate complete meshing, as well as to insure a tight sealing of the unit against seepage of oil from the engine crankcase along the surface of the clutch 15, and into the starting apparatus. A cup-shaped element surrounds and supports the member 72, and has a flange adapted to be received between flanges 12 and 13 of the starter and engine, respectively, and is clamped thereto by bolts 14. This cup-shaped element is a further barrier to oil seepage into the starter.

This application is a division of my application No. 167,054, filed October 2, 1937.

What is claimed is:

1. In starting apparatus of the type embodying an engine engaging jaw clutch member, means having engagement with said jaw clutch member both before and during movement of the latter into engagement with a member of the engine to be started, said means including a flexible ring of organic material, and means for exerting an inwardly directed pressure on said ring, to seal the space surrounding said jaw clutch member.

2. In starting apparatus of the type embodying an engine engaging jaw clutch member, means having engagement with said jaw clutch member both before and during movement of the latter into engagement with a member of the engine to be started, said means including a flexible ring of organic material, and means for exerting an inwardly directed pressure on said ring, to seal the space surrounding said jaw clutch member, said means comprising a one-piece resilient element surrounding said ring, and yieldable therewith.

ROMEO M. NARDONE.